Figure 1:
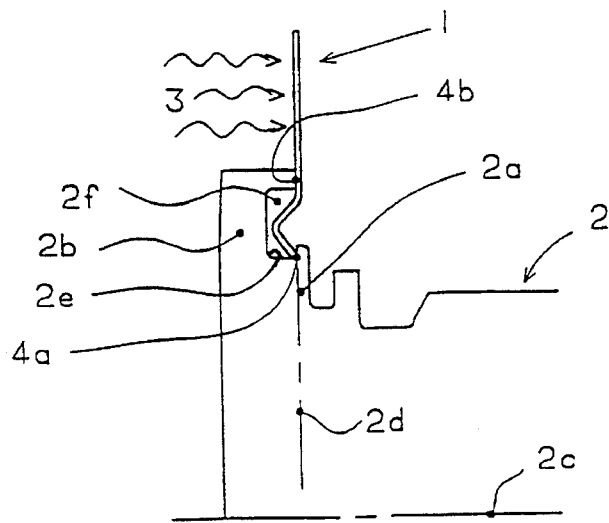

United States Patent [19]

Moroni

[11] Patent Number: 5,487,453
[45] Date of Patent: Jan. 30, 1996

[54] THERMAL PROTECTION DEVICE

[75] Inventor: Jonny Moroni, Livry Gargan, France

[73] Assignee: AlliedSignal Europe Services Techniques, Drancy, France

[21] Appl. No.: 50,199

[22] PCT Filed: Feb. 16, 1993

[86] PCT No.: PCT/FR93/00153

§ 371 Date: May 4, 1993

§ 102(e) Date: May 4, 1993

[87] PCT Pub. No.: WO93/21457

PCT Pub. Date: Oct. 28, 1993

[30] Foreign Application Priority Data

Apr. 9, 1992 [FR] France ................................. 92 04335

[51] Int. Cl.⁶ ............................................. F16D 65/00
[52] U.S. Cl. ................................................. 188/264 G
[58] Field of Search ........................ 188/264 G, 73.1, 188/72.4, 264 R, 370; 92/168, 248

[56] References Cited

U.S. PATENT DOCUMENTS

| 4,401,012 | 8/1983 | Emmett ................................. 188/264 G |
| 4,537,289 | 8/1985 | VonGrunberg et al. ................ 188/72.4 |
| 4,582,180 | 4/1986 | Lauterwasser et al. ............. 188/264 G |

FOREIGN PATENT DOCUMENTS

| 0082028 | 4/1986 | Japan ................................. 188/264 G |
| 2165902 | 4/1986 | United Kingdom ............... 188/264 G |

*Primary Examiner*—Robert J. Oberleitner
*Assistant Examiner*—Chris Schwartz
*Attorney, Agent, or Firm*—Larry J. Palguta; Leo H. McCormick, Jr.

[57] ABSTRACT

A thermal protection device includes a screen (1) and a support (2), the screen (1) for intercepting the radiation (3) from an intense heat source. The screen (1) is applied to the support (2) by elastic deformation and held thereon by exerting on a first bearing surface (4a) and on a second bearing surface (4b) forces oriented respectively along opposite directions.

2 Claims, 1 Drawing Sheet

THERMAL PROTECTION DEVICE

The present invention relates to a thermal protection device which can be used especially for protecting a disk- or drum-brake boot and composed of a support and a thermal screen, the latter comprising a plate pierced through by an orifice in order to present an outer edge and an inner edge, which plate consists of an elastically deformable material not subject to buckling and is held in place on the support by means of at least one first bearing surface on which it exerts, by its inner edge, a force resulting from its elastic deformation, said device comprising additional bearing means supplying the plate with a second bearing surface and enabling this plate to exert on the first and second bearing surfaces forces respectively oriented in opposite directions, the inner edge of the plate being cut out so as to present a plurality of tabs and the support comprising a cylindrical portion which supplies its periphery, or the vicinity of the latter, with a first bearing surface essentially reduced to a circle.

A device of this type is described, for example in document FR-A-2,516,189, in which the support is constituted by one of the pistons which actuate the plate elements of a disk brake, this prior patent illustrating the benefit of thermal protection devices in this type of application.

This device of the prior art, designed essentially for automotive vehicles, suffers from a certain weakness as regards the mechanical retention of the thermal screen, which renders its use more precarious under extreme conditions pertaining to subjected impacts, deformations and vibrations, such as, for example, those encountered in braking systems for heavy road vehicles.

In this context, the object of the invention is to provide an improved thermal protection device which, although not very expensive and permitting easy and rapid mounting, leads to a particularly strong mechanical retention of the thermal screen on the support, on the brake piston for example.

For this purpose, the device of the invention is essentially characterized in that the second bearing surface comprises a plurality of points of the support which are located in a plane or in the vicinity of a plane containing the first bearing surface, but which are separated from the latter towards the outside of the cylindrical portion along a radial direction of the latter.

For example, the second bearing surface comprises at least one portion of an axial face of a second cylindrical portion of the support, contiguous with the first, and the first and second cylindrical portions are joined together forming a groove whose edge common to these portions constitutes the first bearing surface.

Preferably, the invention is finally characterized in that the axial face of the second cylindrical portion of the support is, except in the location of the second bearing surface, hollowed out so as to produce a cavity, in that the plate, in the vicinity of its inner edge, is deformed out of its plane along two folds of opposite concavities in order to form an annular flange, in that said flange is engaged in the cavity without touching the bottom of it and in that the second bearing surface comprises at least one portion of the periphery of the axial face of the second cylindrical portion.

Figure 3:
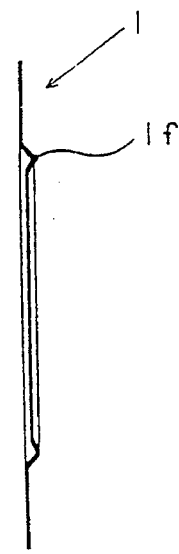
Figure 2:
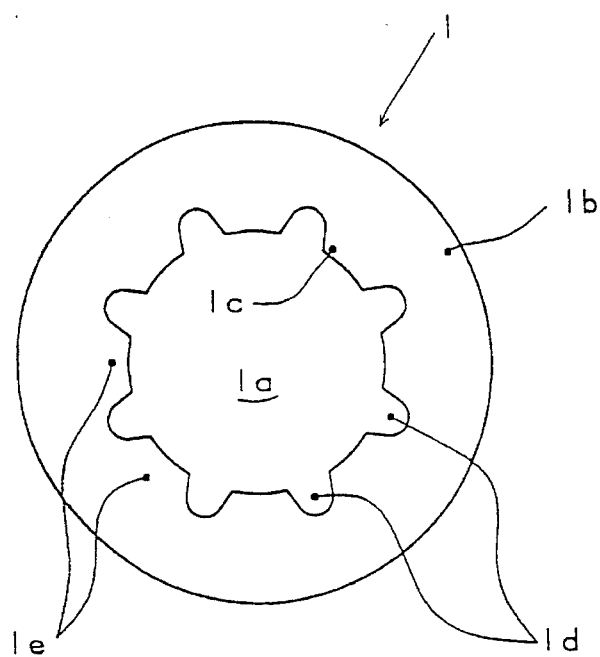

The invention will now be described by way of example with reference to the accompanying drawing in which FIG. 1 is a sectional view of a device in accordance with the invention;

FIG. 2 is a front view of a thermal screen which can be used for the invention; and FIG. 3 is a side view of the same thermal screen.

The thermal protection device of the invention essentially comprises a thermal screen 1 capable of fitting onto a support 2, such as a disk-brake piston, in order to protect from radiation 3, emitted by an intense heat source, all the sensitive elements (not shown) located behind this screen (to the right of the screen 1 in FIGS. 1 and 4).

The thermal screen comprises an essentially plane plate pierced through by a central orifice $1a$ (FIG. 2) so as to present an outer edge $1b$ and an inner edge $1c$.

This plate consists of an elastically deformable material, not subject to buckling and, for example, made from a steel sheet.

The thermal screen 1 thus constituted is held in place on the support 2 by means of at least one first bearing surface $4a$ on which the screen exerts, by its inner edge, a force resulting from its elastic deformation.

In order better to provide this elastic deformation of the thermal screen in the vicinity of its inner edge, it is advantageous, as shown in FIG. 2, to make cutouts, such as $1d$, in the latter so as to produce a plurality of tabs such as $1e$.

The first bearing surface is supplied by the periphery of a cylindrical portion $2a$ of the support, the edges $1b$ and $1c$ of the screen are essentially circular and concentric and the first bearing surface is itself essentially reduced to a circle.

The device comprises additional bearing means ($2b$ in FIG. 1) which supply the screen 1 with a second bearing surface $4b$ and enable the plate which constitutes this screen to exert on the first and second bearing surfaces forces respectively oriented in opposite directions.

According to the invention (FIG. 1), the second bearing surface $4b$ comprises at least one portion of an axial face of a second cylindrical portion $2b$ of the support 2, contiguous with the first cylindrical portion $2a$, of the same axis $2c$, but of greater diameter.

In order to limit the transfer of thermal energy from the support 2 to the screen 1, it is possible to reduce to a set of contact points the bearing surface $4b$, the latter supplying the screen 1 with a plurality of bearing points located in the plane $2d$ which virtually separates the cylindrical portions $2a$ and $2b$, or in the vicinity of this plane, but at a distance from the axis $2c$ greater than that which separates this axis from the first bearing surface $4a$.

The first and second cylindrical portions $2a$, $2b$ are preferably joined together forming a groove $2e$ whose edge common to these portions constitutes the first bearing surface $4a$.

Moreover, the axial face of the second cylindrical portion $2b$ of the support 2 which faces the screen 1 is advantageously hollowed out, except on the portion of its periphery which forms the second bearing surface $4b$, so as to produce an annular cavity $2f$ which is intended to receive an annular flange $1f$ of the screen, this flange resulting from a deformation of the screen out of its plane, in the vicinity of its inner edge $1c$, along two circular concentric folds of opposite concavities, and being inserted into the cavity without touching the bottom of it in the rest position.

The positioning of the screen 1 on the support 2 is obtained by slipping this screen over the smaller diameter portion of the support 2 (to the right of FIG. 1) and then by exerting a pressure on the inside of the flange $1f$ (from right to left), the flexible tabs $1e$ then engaging in the groove $2e$.

In this position, the screen 1 is stressed in a direction which tends, a priori, to cause it to adopt a conical shape pointing towards the left of FIG. 1.

However, insofar as it is produced from an elastic material not subject to buckling, the screen 1 withstands this stress by exerting on the first bearing surface $4a$ a force directed from left to right and, on the second bearing surface $4b$, a force directed in the opposite direction, the combination of these forces leading to a retention of the screen 1 on

I claim:

1. A thermal protection device which can be used for protecting a disk- or drum-brake boot and composed of a support and a thermal screen, the thermal screen comprising a plate pierced through by an orifice to present an outer edge and an inner edge, the plate consisting of an elastically deformable material not subject to buckling and held in place on the support by means of at least one first bearing surface on which the plate exerts, by means of the inner edge, a force resulting from elastic deformation, said device comprising additional bearing means supplying the plate with a second bearing surface and enabling the plate to exert on the first and second bearing surfaces forces oriented respectively in opposite directions, the inner edge of the plate cut out so as to present a plurality of tabs, the support comprising a first cylindrical portion having a circular periphery which constitutes the first bearing surface, the second bearing surface comprising at least one portion of an axial face of a second cylindrical portion of the support, contiguous with the first cylindrical portion and arranged toward the outside of the first cylindrical portion along a radial direction of the first cylindrical portion, the axial face of the second cylindrical portion of the support, except at the second bearing surface, hollowed out to provide a cavity, the plate near of the inner deformed out of a plane of the plate and along two folds of opposite concavities to form an annular flange, said flange located in the cavity without touching a bottom of the cavity, and the second bearing surface comprising at least one portion of the periphery of the axial face of said second cylindrical portion.

2. The device according to claim 1, wherein the first and second cylindrical portions join together to form a groove having a portion providing the first bearing surface.

* * * * *